United States Patent
Lee (10) Patent No.: US 9,008,387 B2
(45) Date of Patent: Apr. 14, 2015

(54) METHOD AND APPARATUS FOR PROCESSING ULTRASOUND IMAGES

(75) Inventor: Jae-keun Lee, Gangwon-do (KR)

(73) Assignee: Samsung Medison Co., Ltd., Gangwon-Do (KR)

(*) Notice: Subject to any disclaimer, the term of this patent is extended or adjusted under 35 U.S.C. 154(b) by 200 days.

(21) Appl. No.: 13/544,577

(22) Filed: Jul. 9, 2012

(65) Prior Publication Data

US 2013/0182926 A1    Jul. 18, 2013

(30) Foreign Application Priority Data

Jan. 13, 2012 (KR) .................. 10-2012-0004512

(51) Int. Cl.
*G06K 9/00* (2006.01)
*G06T 5/00* (2006.01)

(52) U.S. Cl.
CPC ............ *G06T 5/008* (2013.01); *G06K 9/00671* (2013.01); *G06K 2209/01* (2013.01); *G06T 2207/10016* (2013.01); *G06T 2207/10132* (2013.01); *G06T 2207/30004* (2013.01); *Y10S 128/922* (2013.01)

(58) Field of Classification Search
USPC ................. 382/100, 128, 129, 130, 131, 132; 128/922; 378/4–27
See application file for complete search history.

(56) References Cited

U.S. PATENT DOCUMENTS

| 2008/0262354 A1 | 10/2008 | Yoshida et al. |
| 2009/0303252 A1 | 12/2009 | Hyun et al. |
| 2010/0204579 A1 | 8/2010 | Yoshida et al. |

FOREIGN PATENT DOCUMENTS

| JP | 2007-330764 A | 12/2007 |
| JP | 2010183935 A | 8/2010 |
| KR | 101017610 B1 | 2/2011 |

OTHER PUBLICATIONS

Yohida Tetsuya et al. (Japanese publication 2007-330764 will be further referred to as YT). Provided by applicant, cited in IDS. Machine translation provided by examiner.*
Korean Office Action issued in Korean Application No. 10-2012-0004512 dated Mar. 7, 2014, w/English translation.
Korean Notice of Allowance issued in Korean Patent Application No. KR10-2012-0004512 dated Aug. 29, 2014.

* cited by examiner

*Primary Examiner* — Anand Bhatnagar
(74) *Attorney, Agent, or Firm* — McDermott Will & Emery LLP

(57) ABSTRACT

A method of processing ultrasound images, the method including operations of receiving color image data including a plurality of frames; determining one or more key-frames from among the plurality of frames, based on a brightness value of each of the plurality of frames; setting a region of interest (ROI) in each of the one or more key-frames based on brightness values of a plurality of regions included in each of the one or more key-frames; performing image compensation on the plurality of frames based on the ROIs of the one or more key-frames; and reconstructing the color image data by using the image-compensated frames.

15 Claims, 5 Drawing Sheets

METHOD AND APPARATUS FOR PROCESSING ULTRASOUND IMAGES

CROSS-REFERENCE TO RELATED PATENT APPLICATION

This application claims the benefit of Korean Patent Application No. 10-2012-0004512, filed on Jan. 13, 2012, in the Korean Intellectual Property Office, the disclosure of which is incorporated herein in its entirety by reference.

BACKGROUND OF THE INVENTION

1. Field of the Invention

The present invention relates to a method and apparatus for processing ultrasound images, and more particularly, to a method and apparatus for reconstructing color image data by compensating for the color image data.

2. Description of the Related Art

An ultrasound diagnosis apparatus delivers an ultrasound signal (in general, equal to or greater than 20 kHz) to a predetermined internal part of a target object by using a probe, and obtains an image of the internal part of the target object by using information of a reflected echo signal. In particular, the ultrasound diagnosis apparatus is used for medical purposes including detection of foreign materials in the target object, damage measurement and observance, or the like. Compared to X-rays, the ultrasound diagnosis apparatus is stable, is non-invasive, and displays an image in real-time, so that the ultrasound diagnosis apparatus is widely used with an image diagnosis apparatus. The image of the target object, which is obtained via the probe, undergoes a process such as rendering and then is displayed.

SUMMARY OF THE INVENTION

The present invention provides an ultrasound image processing apparatus and a method thereof for improving an image quality of color image data by performing image compensation on a plurality of frames before rendering is performed on the color image data.

The present invention also provides a computer-readable recording medium having recorded thereon a program for executing the method.

According to an aspect of the present invention, there is provided a method of processing ultrasound images, the method including operations of receiving color image data comprising a plurality of frames; determining one or more key-frames from among the plurality of frames, based on a brightness value of each of the plurality of frames; setting a region of interest (ROI) in each of the one or more key-frames based on brightness values of a plurality of regions comprised in each of the one or more key-frames; performing image compensation on the plurality of frames based on the ROIs of the one or more key-frames; and reconstructing the color image data by using the image-compensated frames.

The operation of determining the one or more key-frames may include an operation of dividing the plurality of frames into N frame sections and determining the key-frame in each of the N frame sections, wherein the key-frame has the largest sum of brightness values of a plurality of pixels included in each of one or more frames included in each of the N frame sections.

The operation of setting the ROI may be performed based on a brightness value in a first axis direction and a brightness value in a second axis direction of each of the one or more key-frames.

The operation of setting the ROI may include an operation of setting a region as the ROI, wherein, among the plurality of regions comprised in each of the one or more key-frames, the region has a size equal to or greater than a first threshold value.

The operation of setting the ROI may further include an operation of determining a central point in each of the one or more key-frames, wherein the central point has the largest brightness value in first and second axes directions, and the operation of performing the image compensation may include an operation of determining differences between locations in the first and second axes directions of central points of two consecutive key-frames, and determining central points of frames between the two consecutive key-frames based on the differences.

The operation of performing the image compensation may include an operation of compensating for brightness values of ROIs of frames between two consecutive key-frames from among the plurality of frames, by using a persistence method, and the persistence method may be performed by summing a received data value for a specific frame and a data value of at least one frame that is received before the specific frame, according to a persistence rate, and then by determining a sum value as a data value of the specific frame.

The persistence rate may be randomly set by a user or may be automatically decided according to a period of the determined key-frames.

The operation of performing the image compensation may include an operation of compensating for brightness values of ROIs of frames between two consecutive key-frames from among the plurality of frames, by using a frame interpolation method, and the frame interpolation method may be performed by determining data values of one or more frames between two consecutive specific frames according to data values of the two consecutive specific frames.

According to another aspect of the present invention, there is provided an ultrasound image processing apparatus including a key-frame determining unit for receiving color image data comprising a plurality of frames, and determining one or more key-frames from among the plurality of frames, based on a brightness value of each of the plurality of frames; a region of interest (ROI) setting unit for setting an ROI in each of the one or more key-frames based on brightness values of a plurality of regions comprised in each of the one or more key-frames; and an image compensating unit for performing image compensation on the plurality of frames based on the ROIs of the one or more key-frames, and reconstructing the color image data by using the image-compensated frames.

According to another aspect of the present invention, there is provided a computer-readable recording medium having recorded thereon a program for executing the method.

BRIEF DESCRIPTION OF THE DRAWINGS

The above and other features and advantages of the present invention will become more apparent by describing in detail exemplary embodiments thereof with reference to the attached drawings in which:

FIG. 6 is a graph illustrating a brightness value of each frame after brightness values of the graph of FIG. 4 are compensated for;

DETAILED DESCRIPTION OF THE INVENTION

Hereinafter, the present invention will be described in detail by explaining exemplary embodiments of the invention with reference to the attached drawings.

Figure 1:
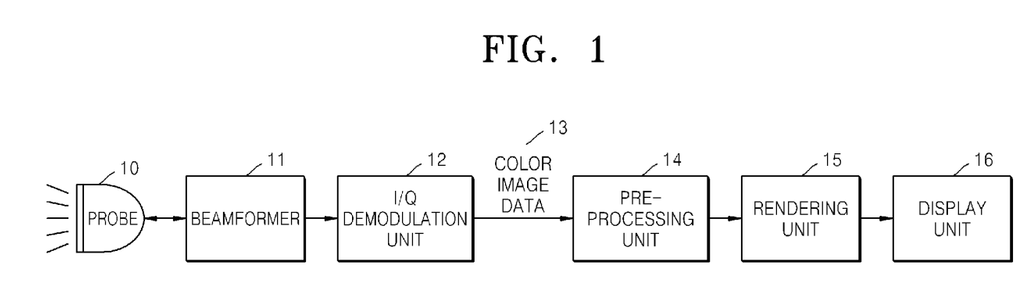
FIG. 1 is a block diagram illustrating an ultrasound color image processing procedure according to an embodiment of the present invention.

FIG. 1 is a diagram illustrating a procedure of processing an ultrasound signal received via a probe 10. A beamformer 11 focuses an emitted beam by adjusting a delay time of the ultrasound signal emitted from the probe 10, and adjusts focusing of a received echo signal. The received ultrasound signal is amplified and then is processed as a Doppler signal via an In-phase/Quadrature (I/Q) demodulation unit 12. The Doppler signal is obtained in the form of color image data 13 and passes through a pre-processing unit 14. Then, the color image data 13 undergoes a rendering process via a rendering unit 15 and is displayed on a display unit 16.

The pre-processing process is called 'pre-processing process' because a processing operation is performed on the color image data 13 before a rendering operation is performed thereon, and hereinafter, an apparatus and method for efficiently improving connectivity between frames of a color image in the pre-processing process will now be described.

Figure 2:
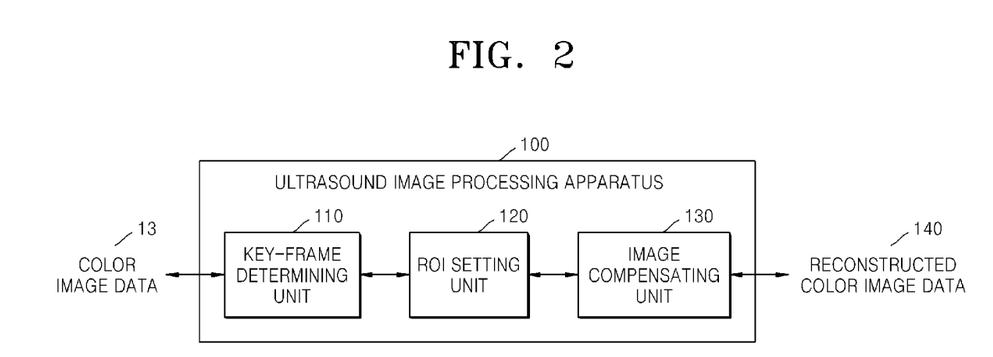
FIG. 2 is a diagram illustrating a structure of an ultrasound image processing apparatus, according to an embodiment of the present invention.

FIG. 2 is a diagram illustrating a structure of an ultrasound image processing apparatus 100 according to an embodiment of the present invention. The ultrasound image processing apparatus 100 may include a key-frame determining unit 110, a region of interest (ROI) setting unit 120, and an image compensating unit 130. The ultrasound image processing apparatus 100 of FIG. 2 only includes configuring elements related to one or more embodiments of the present invention. Thus, it is obvious to one of ordinary skill in the art that general-use elements other than the configuring elements of FIG. 2 may be further included.

The ultrasound image processing apparatus 100 improves connectivity between frames of an image by processing the color image data 13 received via the probe 10. The ultrasound image processing apparatus 100 may be included in an ultrasound diagnosis apparatus (not shown) that diagnoses a target object by using an ultrasound signal and then displays a diagnosis result.

The key-frame determining unit 110 receives the color image data 13 including a plurality of frames, and determines at least one key-frame from among the plurality of frames. In the determination of the at least one key-frame, the key-frame determining unit 110 may determine the at least one key-frame based on a brightness value of each frame.

In the present description, the term 'brightness value' means a power of a signal of a plurality of pixels included in each frame. A brightness value in a black-and-white image means a gray level component between 0 through 255 indicating a brightness of each pixel. On the other hand, pixels included in a frame of a color image may be numerically expressed by digitizing velocity of a measured target object and power of a measured signal in the form of RGB. In this regard, a power component of the measured signal corresponds to the brightness value in the black-and-white image. Accordingly, hereinafter, it is assumed that the term 'brightness value' of a color image means a power component of a measured signal indicated by pixels.

The key-frame determining unit 110 may divide the plurality of frames into N frame sections (where N is a natural number) and may determine a key-frame in every frame section. Also, the key-frame determining unit 110 may determine as a key-frame a frame that has the largest sum of brightness values of a plurality of pixels included in each of one or more frames included in each of the N frame sections.

A process of determining the key-frame will be described in detail with reference to FIGS. 3 and 4.

The ROI setting unit 120 sets an ROI in every key-frame determined by the key-frame determining unit 110, based on a brightness value in first and second axes directions. The first axis and the second axis may be an X-axis and a Y-axis of a key-frame, respectively, and any two axes that meet at right angles may be the first axis and the second axis.

According to the present embodiment, the ROI setting unit 120 may exclude a region from the ROI, wherein the region has a size equal to or less than a threshold value. Also, the threshold value may be randomly set by a user or may be determined according to a type of color image data.

Also, the ROI setting unit 120 may set a central point 530 at which a brightness value of a key-frame is maximal. A process of determining the ROI will be described in detail with reference to FIGS. 3 and 5.

The image compensating unit 130 performs image compensation on the plurality of frames based on ROIs of the key-frames, and reconstructs the color image data 13 by using the image-compensated frames.

According to the present embodiment, when the image compensating unit 130 performs the image compensation on the plurality of frames, the image compensating unit 130 may determine differences between locations in the first and second axes directions of central points 530 of two consecutive key-frames, and may decide central points of frames between the two consecutive key-frames based on the differences.

According to another embodiment, the image compensating unit 130 may compensate for a brightness value of ROIs by using a persistence method, wherein the ROIs are of frames between two consecutive key-frames from among a plurality of frames. The image compensating unit 130 may use a frame interpolation method other than the persistence method. A process of compensating for an image will be described in detail with reference to FIGS. 3 and 6.

Reconstructed color image data 140 that is reconstructed via the image compensating unit 130 may pass through the rendering unit 15 and then may be displayed on the display unit 16.

The ultrasound image processing apparatus 100 may further include a storage unit (not shown) for storing the color image data 13. The storage unit may store the color image data 13 to which key-frame determination has not yet been performed by the key-frame determining unit 110. Alternatively, the storage unit may store the reconstructed color image data 140 that is obtained after the image compensating unit 130 compensates for the color image data 13.

As described above, the ultrasound image processing apparatus 100 may improve connection by compensating for the color image data 13. In this manner, according to the pre-processing process performed before the rendering process, a realistic color image may be provided. Further, a user may have help in efficiently diagnosing the target object.

Hereinafter, a method, performed by the ultrasound image processing apparatus 100, of compensating for the color image data 13 will be described with reference to FIGS. 3 through 5.

Figure 3:
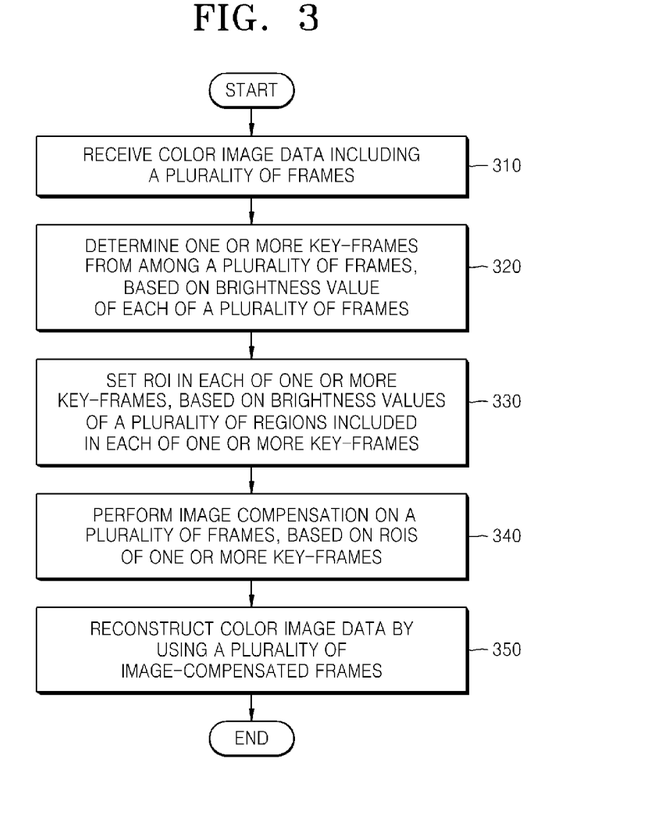
FIG. 3 is a flowchart of a method of processing ultrasound images, according to an embodiment of the present invention.
Figure 4:
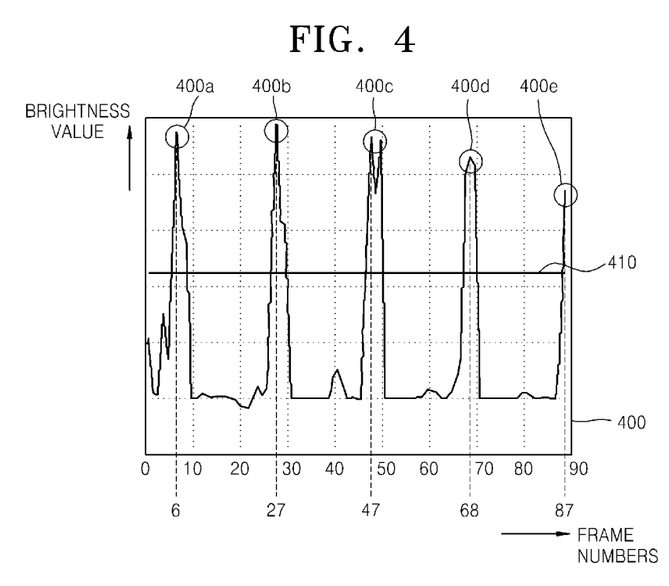
FIG. 4 is a graph illustrating a brightness value of each frame of color image data.

FIG. 3 is a flowchart of a method of processing ultrasound images, according to an embodiment of the present invention.

In operation 310, the key-frame determining unit 110 receives the color image data 13 including a plurality of frames. Each of the plurality of frames may be a two-dimensional (2D) image frame or a three-dimensional (3D) image frame.

In a case of a 2D image frame, the plurality of frames may correspond to B-mode image frames that are obtained by scanning a target object via the probe 10. In a case of a 3D image frame, the plurality of frames may correspond to A/B/C plane image frames, respectively, that are obtained by dividing volume data according to three sections that cross each other. Because the B-mode image frames or the A/B/C plane image frames are a well-known technology to one of ordinary skill in the art, detailed descriptions thereof are omitted here.

According to the present embodiment, after the storage unit stores the color image data 13 as described above, the key-frame determining unit 110 may receive the color image data 13 from the storage unit.

In operation 320, the key-frame determining unit 110 determines at least one key-frame from among the plurality of frames, based on a brightness value of each frame. Each of the plurality of frames included in the color image data 13 includes a plurality of pixels. Accordingly, the key-frame determining unit 110 may obtain a brightness value of a frame by summing all brightness values of a plurality of pixels included in the frame.

When the target object is scanned by using an ultrasound diagnosis apparatus, a type of the probe 10 and a characteristic of the color image data 13 may vary according to a tissue or a part to be scanned. A diagnosis of vascular diseases by scanning blood vessels is referred to as a vascular application. In particular, when an artery is measured in the vascular application, the color image data 13 includes a frame having a large brightness value and a small brightness value, due to a heartbeat period. Due to the brightness difference between frames, it is required to improve connection in the color image data 13.

As described above, when a brightness value of each frame is obtained by summing all brightness values of a plurality of pixels included in each frame, the key-frame determining unit 110 may determine one or more frames having larger brightness values, compared to brightness values of other frames of a plurality of frames. The one or more frames having the larger brightness values correspond to key-frames.

An example in which a key-frame is determined will now be described with reference to FIG. 4. In FIG. 4, a horizontal axis of a frame graph 400 indicates numbers of a plurality of frames included in the color image data 13, and a vertical axis of the frame graph 400 indicates sum values, each obtained by summing brightness values of a plurality of pixels included in each of the plurality of frames. In the plurality of frames of the horizontal axis, the sum value of the brightness values of each of a plurality of frames 400a through 400e is relatively greater than other frames, thus, the frames 400a through 400e may become key-frames. The frames 400a through 400e correspond to $6^{th}$, $27^{th}$, $47^{th}$, $68^{th}$ and $87^{th}$ frames, respectively, and the key-frames are obtained according to a predetermined period. In FIG. 4, the key-frame determining unit 110 may obtain one key-frame for about every 20 frames.

According to the present embodiment, the key-frame determining unit 110 may divide the plurality of frames included in the color image data 13 into N frame sections (where N is a natural number) and may determine a key-frame in every frame section. Accordingly, the key-frame determining unit 110 may obtain one or more key-frames having a predetermined period.

In a case where a sum value of brightness values of a frame does not reach a first threshold value 410, the key-frame determining unit 110 may determine that the frame is not a key-frame. In the example of FIG. 4, although sum values of brightness values of $1^{st}$ through $5^{th}$ frames are greater than sum values of $10^{th}$ through $20^{th}$ frames, the sum values of the brightness values of the $1^{st}$ through $5^{th}$ frames are equal to or less than the first threshold value 410 that is a horizontal line in the middle of the frame graph 400. Accordingly, the key-frame determining unit 110 may determine that the $1^{st}$ through $5^{th}$ frames are not key-frames. The first threshold value 410 may be directly set by a user or may be automatically decided based on a part to be diagnosed.

A process, performed by the key-frame determining unit 110, of determining a key-frame from among a plurality of frames may be performed by using many methods other than the method of using the sum value of the brightness values of each frame.

In another example, instead of determining one key frame in each N frame section, the key-frame determining unit 110 may determine three consecutive frames having large brightness values as candidates for a key-frame and may determine as the key-frame a frame that has the largest brightness value from among the three consecutive frames.

It is obvious to one of ordinary skill in the art that a key-frame from among a plurality of frames may be determined by using many other methods other than the aforementioned methods.

In operation 330, the ROI setting unit 120 sets an ROI 510 for every key-frame, based on brightness values of a plurality of regions included in every key-frame. The key-frame may include the plurality of regions, and the plurality of regions may have different brightness values. From among the plurality of regions, a region that is directly related to a diagnosis target corresponds to the ROI 510.

The ROI 510 may have a larger brightness value, compared to other regions of the plurality of regions.

According to the present embodiment, when the ROI setting unit 120 sets an ROI, the ROI setting unit 120 may make a profile of a brightness value in first and second axes directions. The first axis and the second axis may be an X-axis and a Y-axis of the key-frame, respectively, and any two axes that meet at right angles may be the first axis and the second axis. An example thereof will now be described with reference to FIG. 5.

Figure 5:
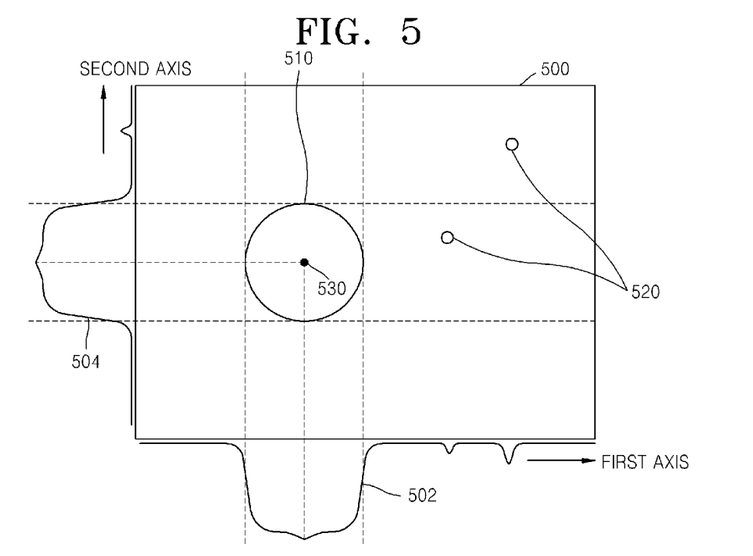
FIG. 5 illustrates an example in which a region of interest (ROI) is set in a key-frame.

In FIG. 5, the ROI 510 is displayed on a key-frame 500. The ROI setting unit 120 may determine a brightness profile 502 in a first axis direction of the key-frame 500 and a brightness profile 504 in a second axis direction of the key-frame 500. Accordingly, when a brightness value of a specific part from among a plurality of pixels included in the key-frame 500 has a large value, the ROI setting unit 120 determines the specific part as the ROI 510.

The image compensating unit 130 may include not only data about a part such as a blood vessel or a body tissue to be diagnosed but also includes undesired data such as noise. Thus, it is necessary for the ROI setting unit 120 to prevent an excluded region 520 from being included in the ROI 510, according to the brightness profiles 502 and 504.

According to the present embodiment, the ROI setting unit 120 may set a second threshold value with respect to a size of the ROI 510 and may determine that the excluded region 520 having a size equal to or less than the second threshold value is not included in the ROI 510 although the excluded region 520 has a large brightness value according to the brightness profiles 502 and 504.

In more detail, the ROI setting unit 120 may obtain one or more regions in every key-frame 500 based on a brightness value according to first and second axes directions, and may select a region among the one or more regions that has a size equal to or greater than the second threshold value, as the ROI 510. In the example of FIG. 5, the ROI setting unit 120 may obtain the regions 510 and 520 that have the large brightness profiles 502 and 504 and may select only the region 510 having a size equal to or greater than the second threshold value as an ROI.

The second threshold value may be randomly set by a user or may be automatically set as a value that is predefined according to a measuring application. The second threshold value with respect to the size of the ROI 510 is different from the first threshold value 410 with respect to the brightness value of the frames.

According to another embodiment, the ROI setting unit 120 may select the central point 530 at which the brightness value according to the first and second axes directions is at its peak value, which is separate from setting the ROI 510. Because a region having the largest brightness value in the key-frame 500 is the ROI 510, the central point 530 may be located in the ROI 510. The central point 530 may be used in image compensation that is performed by the image compensating unit 130, as described below.

In operation 340, the image compensating unit 130 performs image compensation on the plurality of frames based on the ROI 510 of the key-frame. When the image compensating unit 130 performs the image compensation on the plurality of frames, the image compensating unit 130 may perform two types of compensation operations.

First, the image compensating unit 130 may compensate for a location of a central point of each frame. Based on the central point 530 of the key-frame, which is determined by the ROI setting unit 120, the image compensating unit 130 may compensate for locations of central points of frames other than the key-frame. In more detail, the image compensating unit 130 may determine dx and dy that are differences between locations in the first and second axes directions of the central points 530 of two consecutive key-frames, and may determine locations of central points of frames between the two consecutive key-frames based on dx and dy. For example, it is assumed that $1^{st}$ and $11^{th}$ frames are key-frames, and dx and dy that are differences between locations of central points of the $1^{st}$ and $11^{th}$ frames are increased by 20 pixels along the first and second axes directions. In this regard, a $2^{nd}$ frame may have a central point that is moved from the $1^{st}$ frame by 2 pixels in the first and second axes directions. A $3^{rd}$ frame may have a central point that is moved from the $1^{st}$ frame by 4 pixels in the first and second axes directions. In this manner, a $10^{th}$ frame may have a central point that is moved from the $1^{st}$ frame by 10 pixels in the first and second axes directions. As described above, the image compensating unit 130 may perform image compensation by adjusting locations of central points of frames other than key-frames, based on differences between locations of the central points 530 of the key-frames, so that the key-frames may be naturally connected.

Second, the image compensating unit 130 may compensate for a brightness value of each frame. The image compensating unit 130 may compensate for brightness values of ROIs 510 in frames between two consecutive key-frames from among frames included in the color image data 13. When the image compensating unit 130 compensates for the brightness values of the ROIs 510, a persistence method may be used.

The persistence method sums a received data value for a specific frame and a data value of at least one frame that is received before the specific frame, according to a persistence rate, and then decides a sum value as a data value of the specific frame. According to the present embodiment, brightness values of a plurality of pixels included in an ROI 510 of a next frame of a key-frame may be determined based on brightness values of a plurality of pixels included in an ROI 510 of the key-frame. Equation 1 is a basic equation used for the persistence method.

$$y(n)=(1-p)*x(n)+p*y(n-1) \quad \text{[Equation 1]}$$

where, y(n−1) indicates a brightness value of a pixel at a specific location of a key-frame, and x(n) indicates a brightness value of a pixel at the same specific location of a next frame of the key-frame. p indicates a persistence rate and will be described in detail at a later time. y(n) indicates a compensated brightness value of a pixel at a corresponding location, which is obtained by using the persistence method.

The persistence method is performed by summing data of a previous frame and obtained data according to a persistence rate, and Equation 1 corresponds to a basic summing method. Equation 1 is a basic equation related to the persistence method. However, it is obvious to one of ordinary skill in the art that a further complicated equation may be used to sum x(n) and y(n−1).

According to the present embodiment, the persistence rate p may be determined based on a period of key-frames which is determined by the key-frame determining unit 110. As the determined period of key-frames increases, the image compensating unit 130 may determine the persistence rate to have a large value. For example, when a case in which a key-frame is determined in every 10 frames is compared to a case in which a key-frame is determined in every 20 frames, if brightness values of ROIs of frames other than the key-frame are compensated for by using the same persistence rate p, in a case of 20 frames, an affect by a brightness value of the key-frame is considerably decreased in frames after a $10^{th}$ frame. Thus, for a result of brightness value compensation for connection improvement, it is required to determine the persistence rate p as a larger value as more frames are included in a frame section in which a key-frame is determined. This means that an affect by a brightness value of the ROI 510 of the key-frame is increased in frames after the key-frame.

According to another embodiment, when the image compensating unit 130 compensates for the brightness values of the frames, a frame interpolation method other than the persistence method may be used. The persistence method and the frame interpolation method are different from each other in that the persistence method involves performing compensation on frames between key-frames by using brightness values of the key-frames whereas the frame interpolation method involves newly generating frames between the key-frames by using the brightness values of the key-frames. Because the frame interpolation method is a well-known technology to one of ordinary skill in the art, the detailed descriptions thereof are omitted here.

Figure 6:
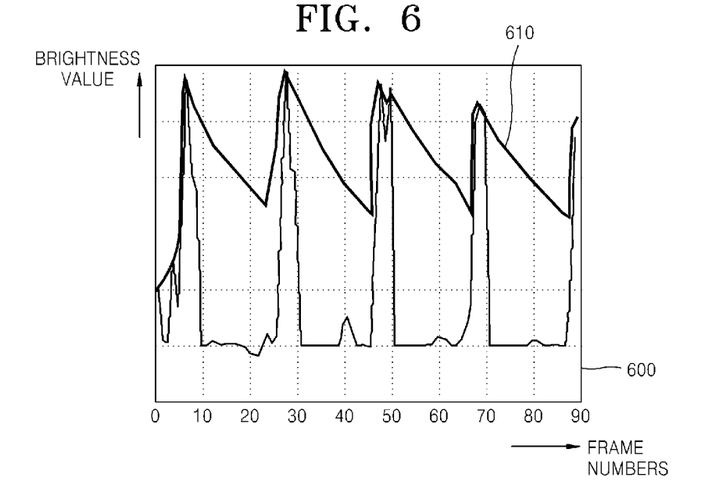

An example in which the image compensating unit 130 compensates for a brightness value will now be described with reference to FIG. 6. FIG. 6 illustrates a frame graph 600 showing a result of compensation for the brightness values of the frame graph 400 in FIG. 4. In FIG. 6, a bold line 610 indicates the result of the compensation for the brightness values of the frame graph 400 in FIG. 4, performed by the image compensating unit 130. Regarding the key-frame 400*a* and the key-frame 400*b* of FIG. 4, a result obtained by the image compensating unit 130 that compensates for brightness values of the key-frame 400*a* and the key-frame 400*b* according to a predetermined persistence rate is shown in FIG. 4. The bold line 610 sharply increases just before a key-frame and then slowly decreases from the key-frame to a next key-frame. This curve shape is called a fast attack slow decay (FASD) technique that is a type of the persistence method. However, it is obvious to one of ordinary skill in the art that many techniques other than the FASD technique may be used.

A reference for compensation for a brightness value does not exist in a portion before the key-frame 400*a*. Thus, the image compensating unit 130 may perform compensation in such a manner that frame numbers may slowly decrease from the key-frame 400*a* that is a first key-frame, or may perform compensation according to brightness values of several frames having larger brightness values, compared to adjacent frames, not key-frames.

When the image compensating unit 130 performs a plurality of frames, an order of compensating locations and brightness values is not fixed, thus, one type of compensation may be randomly performed and then the other type of compensation may be performed, or two types of compensation may be simultaneously performed.

As described above, because the image compensating unit 130 compensates for the brightness value of the ROI 510 and locations of the frames based on the key-frames, the frames other than the key-frames may be naturally connected, so that connection in the color image data 13 may be improved.

In operation 350, the image compensating unit 130 reconstructs the color image data 13 by using the plurality of frames to which the image compensation is performed. The reconstructed color image data 140 undergoes a rendering process and then is displayed to a user. As described above, an operation of storing the reconstructed color image data 140 in the storage unit may be further performed.

According to the present embodiment, when the image compensating unit 130 reconstructs the color image data 13, a predetermined marker may be displayed on key-frames so as to allow the key-frames to be different from other frames. Accordingly, a user may distinguish between the key-frames and compensated frames in the reconstructed color image data 140.

Hereinafter, an embodiment of the present invention will now be described with reference to FIGS. 7 and 8.

Figure 7:
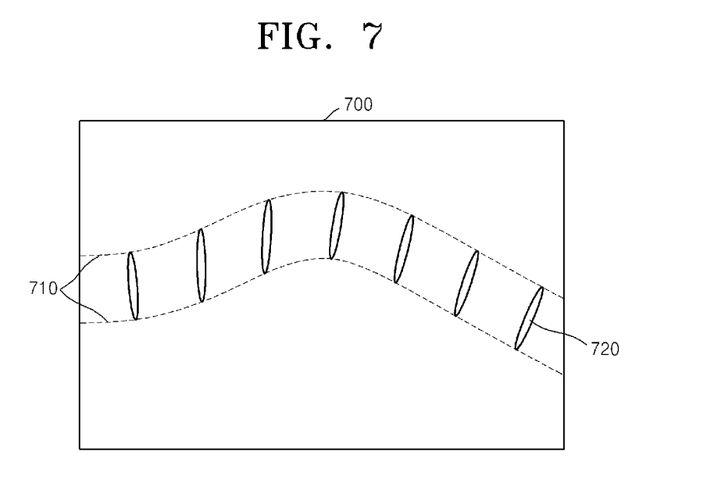
FIG. 7 illustrates an example of color image data.
Figure 8:
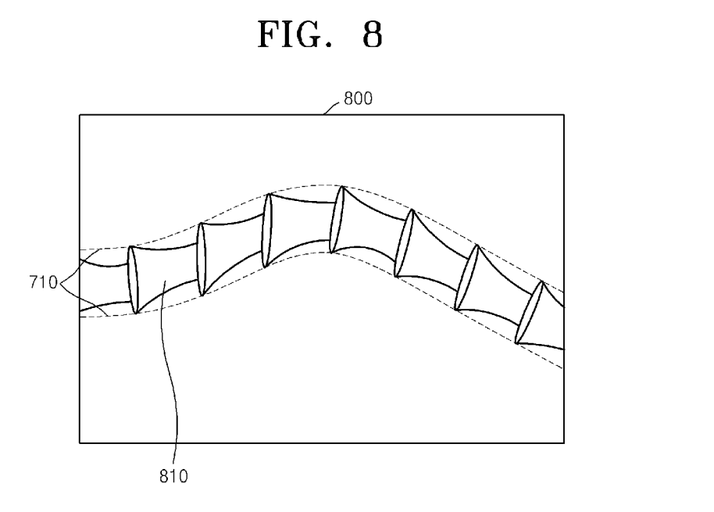
FIG. 8 illustrates data obtained by compensating for brightness values and locations of data of FIG. 7.

FIGS. 7 and 8 illustrate an example in which the color image data 13 for a blood vessel is processed. FIG. 7 illustrates a pre-compensation frame 700 and FIG. 8 illustrates a post-compensation frame 800.

In order to easily illustrate a result of processing the color image data 13, FIGS. 7 and 8 illustrate diagrams in a direction different from a cross-section of FIG. 5. However, an actual reference for determining a key-frame, setting an ROI, and compensating for an image may be based on a frame that is viewed in a direction of FIG. 5.

Referring to FIG. 7, the key-frame determining unit 110 may determine frames 720 having large brightness values as key-frames. The ROI setting unit 120 may set an ROI 710 for each of the key-frames. Further, the image compensating unit 130 may compensate for brightness values and locations of frames between the key-frames, according to the ROI 710.

FIG. 8 illustrates the post-compensation frame 800. FIG. 8 illustrates a result obtained by determining the frames 720 having the large brightness values as the key-frames and then by compensating for brightness values and locations of frames other than the key-frames. Compared to the result of FIG. 7, in FIG. 8, the frames other than the key-frames have a compensated brightness value 810. Compared to the result of FIG. 7, in FIG. 8, the frames other than the key-frames are naturally connected to the key-frames, so that the result of FIG. 8 may help a user to efficiently diagnose the blood vessel.

According to the one or more embodiments of the present invention, an image quality of color image data may be improved by assuring connection between frames of the color image data. Therefore, a target object may be efficiently diagnosed by using the ultrasound diagnosis apparatus.

The embodiments of the present invention can be written as computer programs and can be implemented in general-use digital computers that execute the programs using a computer-readable recording medium. In addition, a data structure used in the embodiments of the present invention can be written in a computer-readable recording medium through various means. Examples of the computer-readable recording medium include magnetic storage media (e.g., ROM, floppy disks, hard disks, etc.), optical recording media (e.g., CD-ROMs, or DVDs), etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of processing ultrasound images, the method comprising:
   receiving color image data comprising a plurality of frames;
   determining one or more key-frames from among the plurality of frames, based on a brightness value of each of the plurality of frames;
   setting a region of interest (ROI) in each of the one or more key-frames based on brightness values of a plurality of regions comprised in each of the one or more key-frames;
   performing image compensation on the plurality of frames based on the ROIs of the one or more key-frames; and
   reconstructing the color image data by using the image-compensated frames,
   wherein the determining of the one or more key-frames comprises dividing the plurality of frames into N frame sections and determining the key-frame in each of the N frame sections, and
   wherein the key-frame has the largest sum of brightness values of a plurality of pixels comprised in each of one or more frames comprised in each of the N frame sections.

2. The method of claim 1, wherein the setting of the ROI is performed based on a brightness value in a first axis direction and a brightness value in a second axis direction of each of the one or more key-frames.

3. The method of claim 1, wherein the setting of the ROI comprises setting a region as the ROI, wherein, among the plurality of regions comprised in each of the one or more key-frames, the region has a size equal to or greater than a first threshold value.

4. The method of claim 1, wherein the setting of the ROI further comprises determining a central point in each of the one or more key-frames, wherein the central point has the largest brightness value in first and second axes directions, and
   the performing of the image compensation comprises determining differences between locations in the first and second axes directions of central points of two consecutive key-frames, and determining central points of frames between the two consecutive key-frames based on the differences.

5. The method of claim 1, wherein the performing of the image compensation comprises compensating for brightness values of ROIs of frames between two consecutive key-frames from among the plurality of frames, by using a persistence method, and the persistence method is performed by summing a received data value for a specific frame and a data value of at least one frame that is received before the specific frame, according to a persistence rate, and then by determining a sum value as a data value of the specific frame.

6. The method of claim 5, wherein the persistence rate is randomly set by a user or is automatically decided according to a period of the determined key-frames.

7. The method of claim 1, wherein the performing of the image compensation comprises compensating for brightness values of ROIs of frames between two consecutive key-frames from among the plurality of frames, by using a frame interpolation method, and the frame interpolation method is performed by determining data values of one or more frames between two consecutive specific frames according to data values of the two consecutive specific frames.

8. An ultrasound image processing apparatus comprising:
a key-frame determining unit for receiving color image data comprising a plurality of frames, and determining one or more key-frames from among the plurality of frames, based on a brightness value of each of the plurality of frames;
a region of interest (ROI) setting unit for setting an ROI in each of the one or more key-frames based on brightness values of a plurality of regions comprised in each of the one or more key-frames; and
an image compensating unit for performing image compensation on the plurality of frames based on the ROIs of the one or more key-frames, and reconstructing the color image data by using the image-compensated frames,
wherein the key-frame determining unit divides the plurality of frames into N frame sections and determines the key-frame in each of the N frame sections, and
wherein the key-frame has the largest sum of brightness values of a plurality of pixels comprised in each of one or more frames comprised in each of the N frame sections.

9. The ultrasound image processing apparatus of claim 8, wherein the ROI setting unit sets the ROI based on a brightness value in a first axis direction and a brightness value in a second axis direction of each of the one or more key-frames.

10. The ultrasound image processing apparatus of claim 8, wherein the ROI setting unit sets a region as the ROI, wherein, among the plurality of regions comprised in each of the one or more key-frames, the region has a size equal to or greater than a first threshold value.

11. The ultrasound image processing apparatus of claim 8, wherein the ROI setting unit determines a central point in each of the one or more key-frames, wherein the central point has the largest brightness value in first and second axes directions, and the image compensating unit determines differences between locations in the first and second axes directions of central points of two consecutive key-frames, and determines central points of frames between the two consecutive key-frames based on the differences.

12. The ultrasound image processing apparatus of claim 8, wherein the image compensating unit compensates for brightness values of ROIs of frames between two consecutive key-frames from among the plurality of frames, by using a persistence method, and the persistence method is performed by summing a received data value for a specific frame and a data value of at least one frame that is received before the specific frame, according to a persistence rate, and then by determining a sum value as a data value of the specific frame.

13. The ultrasound image processing apparatus of claim 12, wherein the persistence rate is randomly set by a user or is automatically determined according to a period of the determined key-frames.

14. The ultrasound image processing apparatus of claim 8, wherein the image compensating unit compensates for brightness values of ROIs of frames between two consecutive key-frames from among the plurality of frames, by using a frame interpolation method, and the frame interpolation method is performed by determining data values of one or more frames between two consecutive specific frames according to data values of the two consecutive specific frames.

15. A non-transitory computer-readable recording medium having recorded thereon a program for executing the method of claim 1.

* * * * *